Nov. 4, 1969  V. A. HOMAN  3,476,439
CHIP COLLECTOR AND EXHAUSTER
Filed Jan. 12, 1968  3 Sheets-Sheet 1

Virgil A. Homan
INVENTOR.

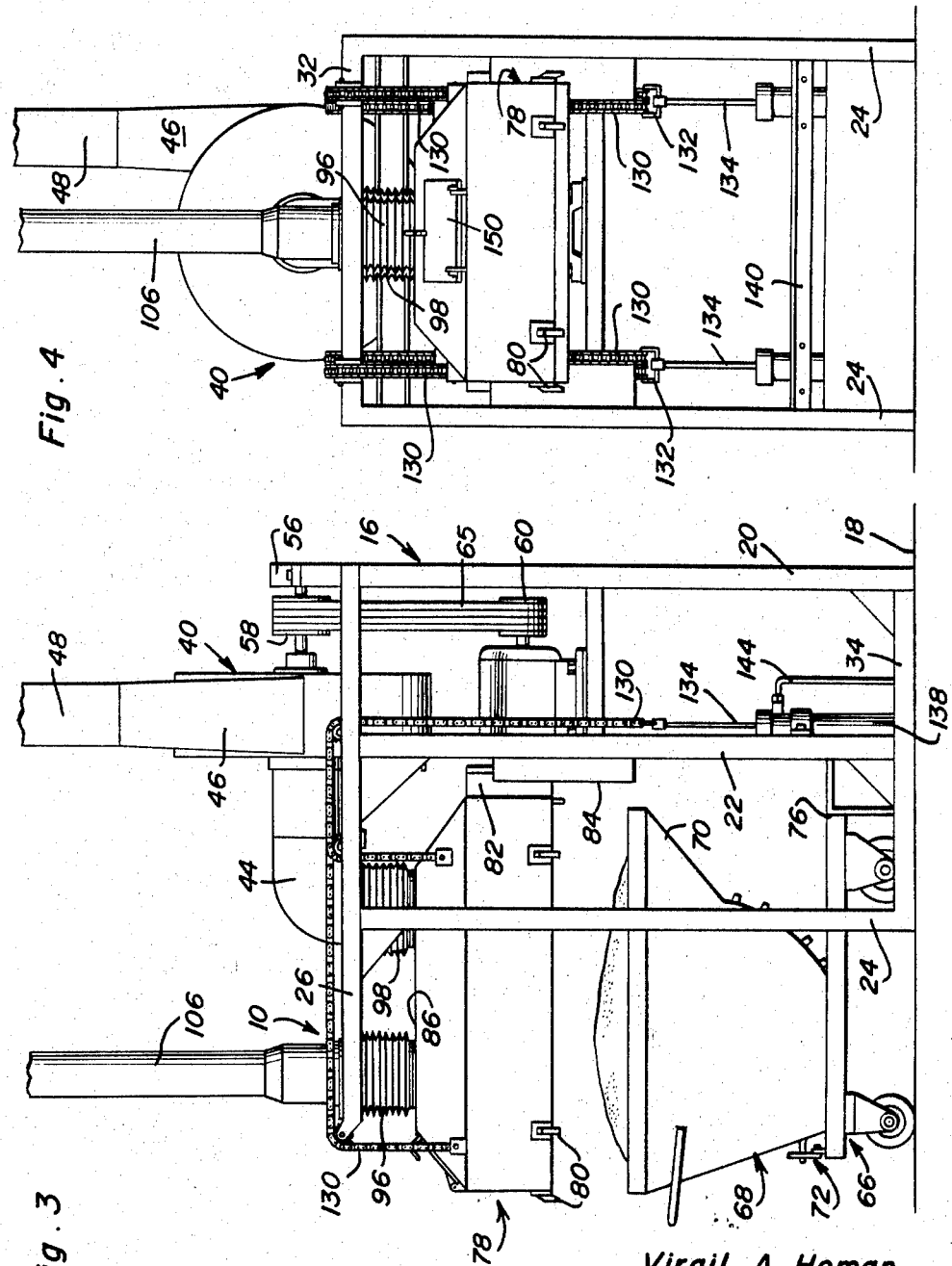

Nov. 4, 1969  V. A. HOMAN  3,476,439
CHIP COLLECTOR AND EXHAUSTER
Filed Jan. 12, 1968  3 Sheets-Sheet 3

Virgil A. Homan
INVENTOR.

BY Lawrence A. O'Brien
and Harvey B. Jacobson
Attorneys

United States Patent Office 3,476,439
Patented Nov. 4, 1969

3,476,439
CHIP COLLECTOR AND EXHAUSTER
Virgil A. Homan, St. Henry, Ohio
(Box 381, Homan Road, Maria Stein, Ohio 45860)
Filed Jan. 12, 1968, Ser. No. 697,346
Int. Cl. B65g 53/04, 53/40
U.S. Cl. 302—17     10 Claims

ABSTRACT OF THE DISCLOSURE

A stand from which a downwardly opening hood is supported for vertical adjustment, the hood having first and second vacuum lines opening into the hood at their inlet and outlet ends, respectively, and an upwardly opening and horizontally shiftable receptacle disposed beneath the hood with the hood being lowerable to a position closing the upper end of the receptacle in reasonably good airtight sealed engagement therewith and the receptacle being horizontally shiftable outwardly from beneath the hood when the latter is in its raised position. The outlet end of the first vacuum line is adapted for connection with a suitable source of vacuum and the inlet end of the second vacuum line is adapted to be positioned adjacent the cutting member of a cutting tool adapted to perform cutting operations on a workpiece.

---

The chip collector and exhauster of the instant invention has been designed to remove, by vacuum, dust, chips of material which have been cut from workpieces and smoke from the area immediately adjacent a cutting member performing a cutting operation on a workpiece. The chip collector and exhauster includes a readily removable and replaceable hopper into which the debris and waste picked up by the exhauster is deposited and the chip collector and exhauster has been specifically designed to be utilized in conjunction with Roura hoppers. Of course, hoppers or receptacles differing in construction and operation from the Roura hopper may be used but the latter has proven to be convenient and economical in that utilization of the Roura hopper enables the waste materials to be more efficiently and economically handled.

The main object of this invention is to provide a means by which smoke, chips and dust may be vacuumed from the cutting area of a milling machine and conveyed to a suitable receptacle for collecting the chips and dust and exhausting the smoke to the ambient atmosphere at a remote location.

Another object of this invention is to provide a chip collector and exhauster in accordance with the preceding object and including a receptacle for the chips and dust which may be readily removed and replaced as well as emptied for ease and convenience of maintenance performed in connection with the chip collector and exhauster.

Yet another object of this invention is to provide an assemblage in accordance with the preceding object and which may be readily adapted for use in conjunction with substantially all machines capable of performing cutting operations on workpieces.

A final object of this invention to be specifically enumerated herein is to provide a chip collector and exhauster in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged side elevational view of the chip collector and exhauster with the hood portion thereof in an elevated position for removal of the associated receptacle or hopper from therebeneath;

FIGURE 4 is an end elevational view of the assemblage illustrated in FIGURE 3 as seen from the left side of FIGURE 3 and with the receptacle or hopper removed;

Figure 1:
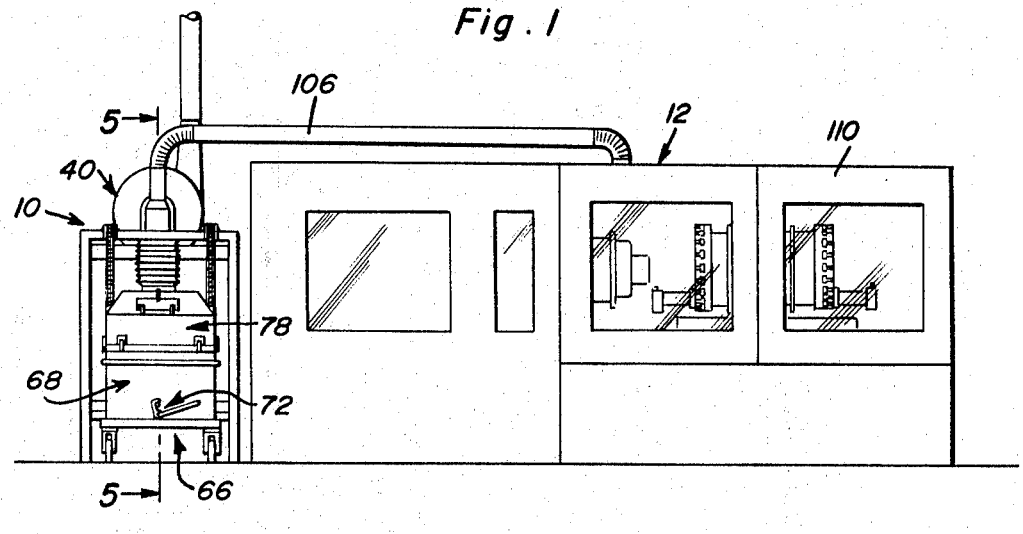
FIGURE 1 is an elevational view of the chip collector and exhauster as seen operatively associated with a totally enclosed memory lathe whereby the coolant mist in the enclosure about the lathe may be readily exhausted therefrom.
Figure 2:
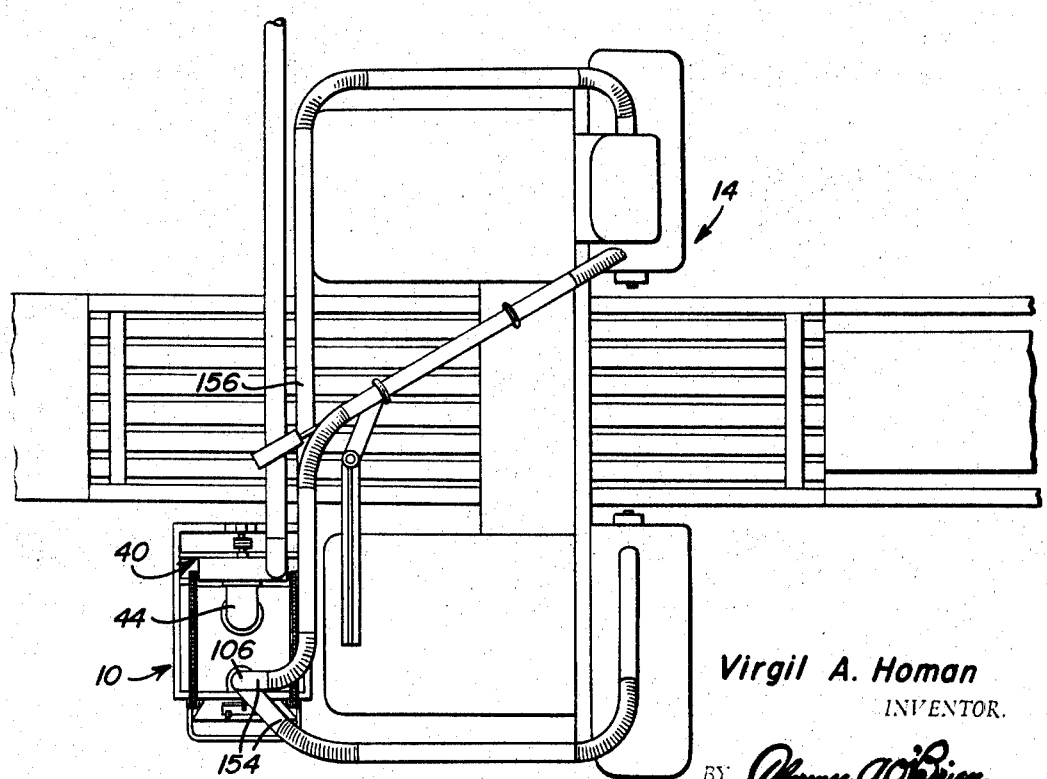
FIGURE 2 is a top plan view of the chip collector and exhauster operatively associated with a vertical and horizontal mill installation.

Referring now more specifically to the drawings, the numeral 10 generally designates the chip collector and exhauster assembly of the instant invention which is illustrated in FIGURE 1 as operatively associated with a fully enclosed memory lathe generally referred to by the reference numeral 12. In FIGURE 2 of the drawings the assembly 10 is operatively associated with a vertical and horizontal mill installation referred to in general by the reference numeral 14.

With attention now invited more specifically to FIGURES 3–6 of the drawings, it may be seen that the assembly 10 includes a stand referred to in general by the reference numeral 16 supported from the floor 18 of a machine shop or the like. The stand 16 includes a plurality of uprights 20, 22 and 24 interconnected at their upper ends by means of a pair of longitudinal members 26 and a plurality of transverse members 28, 30 and 32. The lower ends of the uprights 20, 22 and 24 are interconnected by means of a pair of longitudinal members 34 and a pair of transverse members 36 and 38.

A blower assembly generally referred to by the reference numeral 40 is supported from the stand 16 between the upper ends of the uprights 22 and includes an inlet neck 42 with which the outlet end of a vacuum pipe 44 is communicated. The blower assembly 40 also includes an outlet 46 with which the inlet end of the discharge pipe 48 is operatively communicated and a blower rotor assembly generally referred to by the reference numeral 50 is disposed within the housing 52 of the blower assembly 40 and mounted on a drive shaft 54 journaled through one wall of the housing 52 and at one extended end by means of a journal block assembly 56 supported from the transverse member 28 in any convenient manner. The drive shaft 54 includes a plurality of pulleys 58 aligned with pulleys 60 mounted on the output shaft 62 of an electric motor 64 and belts 65 one entrained about the pulleys 58 and 60 drivingly connecting the motor 64 to the shaft 54. The electric motor 64 may be replaced by any suitable prime mover and may be in the form of a two speed motor, if desired.

Figure 5:
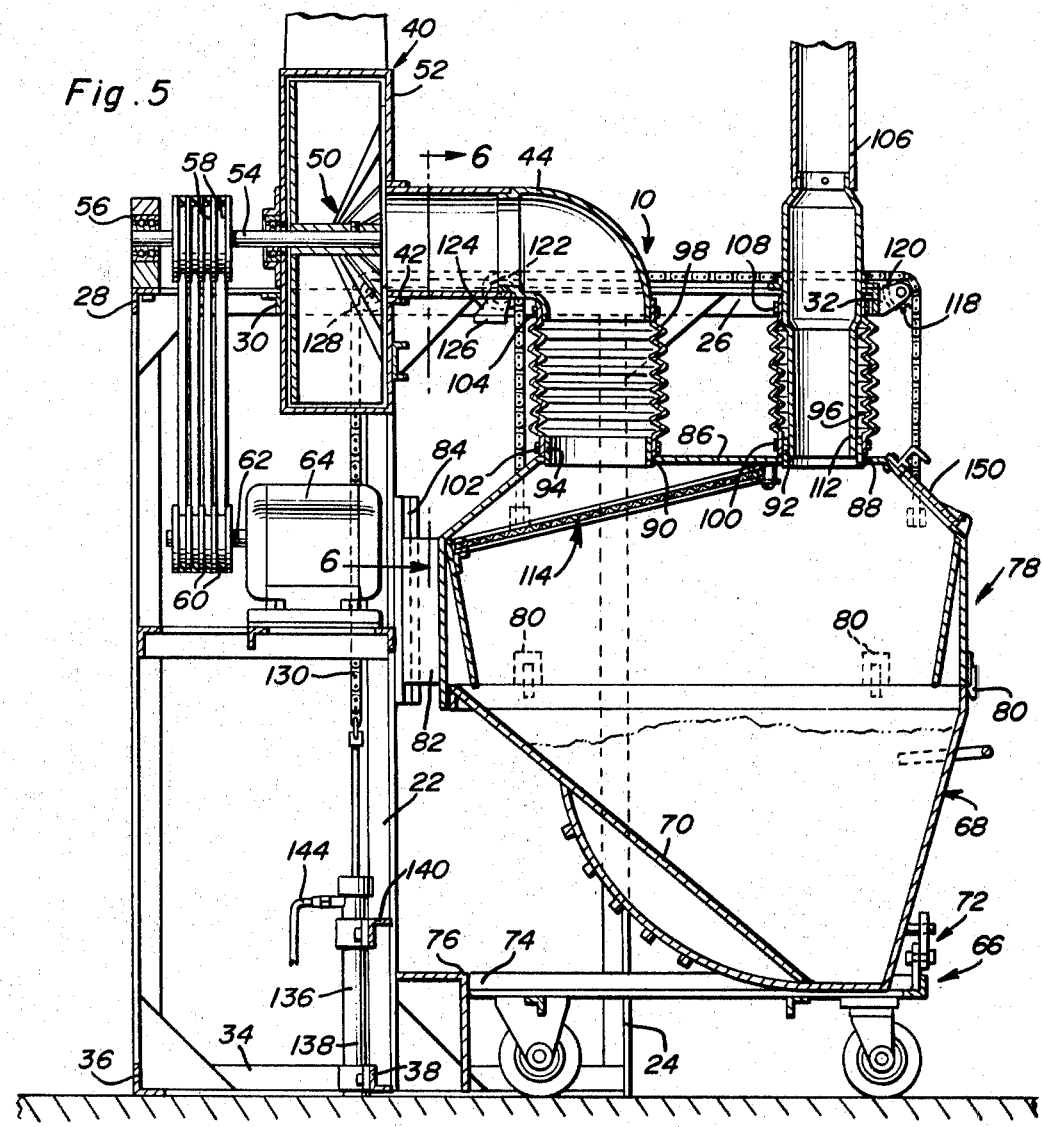
FIGURE 5 is an enlarged vertical sectional view taken substantially upon the plane generally indicated by the section line 5—5 of FIGURE 1.
Figure 6:
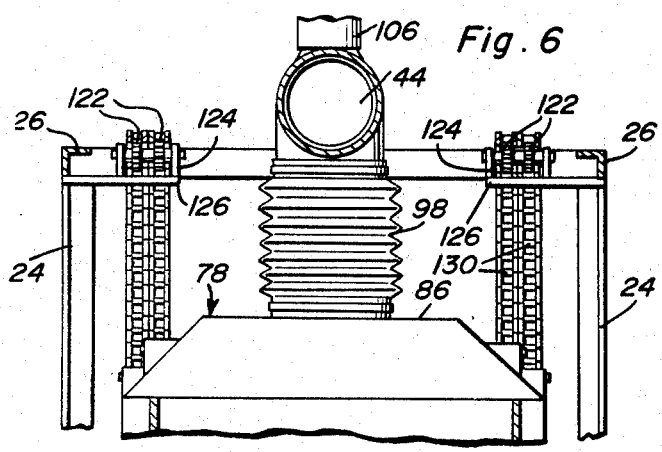
FIGURE 6 is a fragmentary vertical sectional view taken substantially upon the plane indicated by the section line 6—6 of FIGURE 5.

The front of the stand 16 between the uprights 24 is open for rolling movement of a Roura hopper between the uprights 24. The Roura hopper includes a wheeled supporting frame portion generally referred to by the reference numeral 66 and an upper receptacle portion generally referred to by the reference numeral 68. The receptacle portion 68 is supported from the frame portion 66 for limited rolling movement from the upright position of the receptacle portion 68 illustrated in FIGURE 5 of the drawings to an inclined position with the inclined wall 70 of the receptacle portion 68 inclined downwardly toward the open portion of the receptacle assembly 68 which opens upwardly when the receptacle portion 68 is positioned as illustrated in FIGURE 5 of the drawings. A latch assembly generally referred to by the reference numeral 72 is provided for releasably retaining the receptacle portion 68 in the position thereof illustrated in FIGURE 5 of the drawings and the wheeled frame portion 66 is snugly receivable between the uprights 24 to a rearmost position with the front end 74 of the frame portion 66 abutted against an abutment structure 76 extending between the uprights 22. Accordingly, the uprights 22 and the abutment structure 76 define a predetermined position of the receptacle portion 68 in which the receptacle portion 68 is positioned directly beneath the hood assembly referred to in general by the reference numeral 78 of the assembly 10.

The hood assembly 78 defines a downwardly opening hood including depending peripheral walls provided with cam-type centering elements 80 which are engageable with the upper edges of the receptacle portion 68 to ensure that the hood assembly 78 forms a reasonably good airtight seal with the open upper end of the Roura hopper. In addition, the hood assembly 78 includes a follower structure 82 slidably engaged with a guide structure 84 supported from the uprights 22 and therefore the hood assembly 78 is mounted for vertical shifting movement relative to the stand 16 toward and away from engagement with the open upper end of the receptacle portion 68.

The hood assembly 78 includes a top wall 86 having an inlet opening 88 and an outlet opening 90 therein. A pair of sleeve members 92 and 94 are secured in the openings 88 and 90 and the lower ends of a pair of bellows sleeves 96 and 98 are secured over the upper ends of the sleeves 92 and 94 by means of suitable clamp assemblies 100 and 102.

The upper end of the bellows sleeve 98 is secured over the inlet end of the vacuum pipe by means of a clamp assembly 104 and the upper end of the bellows sleeve 96 is secured over the outlet end portion of a vacuum pipe 106 by means of a clamp assembly 108. The vacuum pipe 106 extends to the enclosure 110 for the memory lathe 12 and is thereby operative to draw large quantities of air from the interior of the enclosure 110. Accordingly, it may be seen that the hood assembly 78 may be shifted vertically relative to the vacuum pipes 44 and 106, the latter including a downward extension 112 which projects at least slightly into the sleeve 92 when the hood assembly 78 is disposed in its lowermost position thereby protecting the flexible bellows sleeve 96 from impact by any hard objects being carried through the vacuum pipe 106 by the airstream moving therethrough.

It may also be seen from FIGURE 5 of the drawings that the hood assembly 78 includes a removable baffle-type filter assembly generally referred to by the reference numeral 114. The filter assembly 114 divides the interior of the hood assembly 78 into a first compartment with which the inlet end of the vacuum pipe 44 is directly communicated and a second chamber with which the outlet end of the vacuum pipe 106 is directly communicated. Therefore, any debris entering the hood assembly 78 through the vacuum pipe 106 may not pass outwardly from the hood assembly 78 through the vacuum pipe 44 inasmuch as such debris will be prevented from passing through the filter assembly 114.

A pair of sprocket wheels 118 are journaled from suitable mounts 120 carried by the transverse member 32 and a pair of sprocket wheels 122 are journaled from mounts 124 carried by additional transverse members 126 of the stand 16. Finally, two pairs of sprocket wheels 128 are journaled from suitable mounts 130 supported from the stand 16. Two pairs of chains 130 have corresponding ends secured to anchors 132 carried by the free ends of piston rod portions 134 of a pair of extendible fluid motors 136 whose cylinder portions 138 are suitably anchored to the transverse member 38 and an additional transverse member 140. The ends of the chains 130 remote from the anchors 132 are trained over the sprocket wheels 128, 122 and 118 and are secured to the four corner portions of the hood assembly 78 whereby contraction of the fluid motors 136 will cause the hood assembly 78 to be raised and extension of the fluid motors 136 will cause the hood assembly 78 to be lowered. Of course, the cylinder portions 138 of the extendible fluid motors 136 may be communicated with any suitable source of fluid under pressure through lines 144. Thus, not only does the follower structure 82 and guide structure 84 guide the hood assembly 78 during its vertical shifting, but the chains 130 and the positioning of the sprocket wheels 128, 122 and 118 also serve to guide the hood assembly 78 during its vertical adjustment relative to the stand 16.

In operation, the motor 64, if a two speed motor, may be operated at the desired speed whereupon large quantities of air will be drawn from within the enclosure 110 of the memory lathe 112. Of course, the inlet end of the vacuum pipe 106 may include branch lines (not shown) extending to various cutting head portions of the lathe 12 in order to vacuum the lathe cuttings. As the debris picked up by the air passing through the vacuum pipe 106 passes downwardly into the hood assembly 78, the rapid upward swinging movement of the air tends to spin the debris out of the air by centrifugal force and therefore only the lighter particles of debris moving upwardly toward the inlet end of the vacuum pipe 44 will contact the filter assembly 114, the heavier particles of debris falling immediately to the bottom of the receptacle portion 68. The vacuum air then passes through the vacuum pipe 44 and into the housing assembly 52 before being discharged from the latter through the discharge pipe 48.

Whenever the receptacle portion 68 is substantially full of debris, which can be determined through a transparent viewing window 150 in an upper wall portion of the hood assembly 78, the fluid motors 136 may be actuated in order to raise the hood assembly 78 after which the Roura hopper may be rolled from beneath the hood assembly 78 and the receptacle portion 68 thereof may be allowed to automatically tilt to the dumping position by actuating the latch assembly 72 for releasing the receptacle portion 68. Then, after the receptacle portion 68 has been emptied, it may be returned to and latched in its upright position by means of the latch assembly 72 and thereafter the Roura hopper may be again pushed beneath the hood assembly 78 up against the abutment 76 before again lowering the hood assembly 78 over the upper end of the receptacle portion 68.

With attention now invited more specifically to FIGURE 2 of the drawings it may be seen that the vacuum pipe 106 may branch into a pair of branch vacuum pipes 154 and that each of the branch vacuum pipes 154 may extend to a desired loctaion of the vertical and horizontal milling machine 14. Further, each of the vacuum pipes 154 may also include a branch vacuum pipe 156, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:
1. A chip collector and exhauster comprising a stand, a downwardly opening hood supported from said stand for vertical adjustment relative thereto, a first vacuum line having its inlet end opening into said hood and a second vacuum line having its outlet end opening into said hood, an upwardly opening and horizontally shiftable receptacle disposed beneath said hood, said hood being vertically shiftable between an elevated position spaced above said receptacle and a lowered position closing the upper end of said receptacle in reasonably good airtight sealed engagement therewith, the outlet end of said first vacuum line being adapted for communication with a suitable source of vacuum and said inlet end of said second vacuum line being adapted to be positioned adjacent the cutting member of a cutting tool adapted to perform cutting operations on a workpiece, said stand including means defining a horizontally outwardly opening recess into which said receptacle may be horizontally advanced along a straight path and portions operable to form abutments for engagement by said receptacle to terminate movement of said receptacle along said path with the receptacle in proper position beneath said hood for automatic sealed engagement of the latter with the receptacle upon the hood being shifted to its lowered position.

2. The combination of claim 1 wherein said receptacle includes a wheeled lower portion.

3. The combination of claim 2 wherein said receptacle also includes an upper waste receiving portion supported from said wheeled lower portion for movement between an upright upwardly opening position and a position with said upper portion supported so as to dump waste therefrom by gravity.

4. The combination of claim 1 wherein said vacuum lines include portions thereof stationarily supported from said stand and flexible portions thereof extending from said stationary portions to said hood and opening into the latter.

5. The combination of claim 1 wherein said downwardly opening hood includes removable air filter panel means completely enclosing the area of the inside of said hood into which the inlet end of said first vacuum line opens, said outlet end of said second vacuum line opening through said hood in a second area thereof disposed outwardly of the first mentioned area.

6. The combination of claim 1 wherein said first and second vacuum lines open downwardly into the interior of said hood through upper wall portions thereof.

7. A chip collector and exhauster comprising a stand, a downwardly opening hood supported from said stand for vertical adjustment relative thereto, a first vacuum line having its inlet end opening into said hood and a second vacuum line having its outlet end opening into said hood, an upwardly opening and horizontally shiftable receptacle disposed beneath said hood, said hood being vertically shiftable between an elevated position spaced above said receptacle and a lowered position closing the upper end of said receptacle in reasonably good airtight sealed engagement therewith, the outlet end of said first vacuum line being adapted for communication with a suitable source of vacuum and said inlet end of said second vacuum line being adapted to be positioned adjacent the cutting member of a cutting tool adapted to perform cutting operations on a workpiece, said vacuum lines including portions thereof stationarily supported from said stand and flexible portions thereof extending from said stationary portions to said hood and opening into the latter, said flexible portion of said second vacuum line including a straight axially compressible portion thereof immediately adjacent and secured to said hood, said stationary portion of said second vacuum line including an outlet end portion disposed within said axially compressible portion and telescopingly associated with the end of said axially compressible portion secured to said hood for forming a wear resistant lining for said axially compressible portion.

8. A chip collector and exhauster comprising a stand, a downwardly opening hood supported from said stand for vertical adjustment relative thereto, a first vacuum line having its inlet end opening into said hood and a second vacuum line having its outlet end opening into said hood, an upwardly opening and horizontally shiftable receptacle disposed beneath said hood, said hood being vertically shiftable between an elevated position spaced above said receptacle and a lowered position closing the upper end of said receptacle in reasonably good airtight sealed engagement therewith, the outlet end of said first vacuum line being adapted for communication with a suitable source of vacuum and said inlet end of said second vacuum line being adapted to be positioned adjacent the cutting member of a cutting tool adapted to perform cutting operations on a workpiece, said hood being suspended from said stand by means of a plurality of elongated tension members having one set of corresponding end portions secured to said hood at points spaced generally evenly about the horizontal periphery of said hood, said tension members being guidingly supported from said stand for longitudinal shifting relative to the latter, and means supported from said stand and operatively connected to the other set of corresponding end portions of said tension members operative to effect longitudinal shifting of said tension members relative to said stand.

9. The combination of claim 8 wherein said vacuum lines include portions thereof stationarily supported from said stand and flexible portions thereof extending from said stationary portions to said hood and opening into the latter.

10. The combination of claim 9 wherein said flexible portion of said second vacuum line includes a straight axially compressible portion thereof immediately adjacent and secured to said hood, said stationary portion of said second vacuum line including an outlet end portion disposed within said axially compressible portion and telescopingly associated with the end of said axially compressible portion secured to said hood for forming a wear resistant lining for said axially compressible portion.

References Cited
UNITED STATES PATENTS

| 1,395,701 | 11/1921 | Cain | 214—41 |
| 1,422,997 | 7/1922 | McGregor | 214—41 |
| 2,803,501 | 8/1957 | Kelly | 302—17 |

ANDRES H. NIELSEN, Primary Examiner

U.S. Cl. X.R.

102—59